Jan. 11, 1938.  J. J. JAKOSKY  2,105,247
METHOD AND APPARATUS FOR ELECTRICAL EXPLORATION OF THE SUBSURFACE
Filed Nov. 25, 1936  3 Sheets-Sheet 1
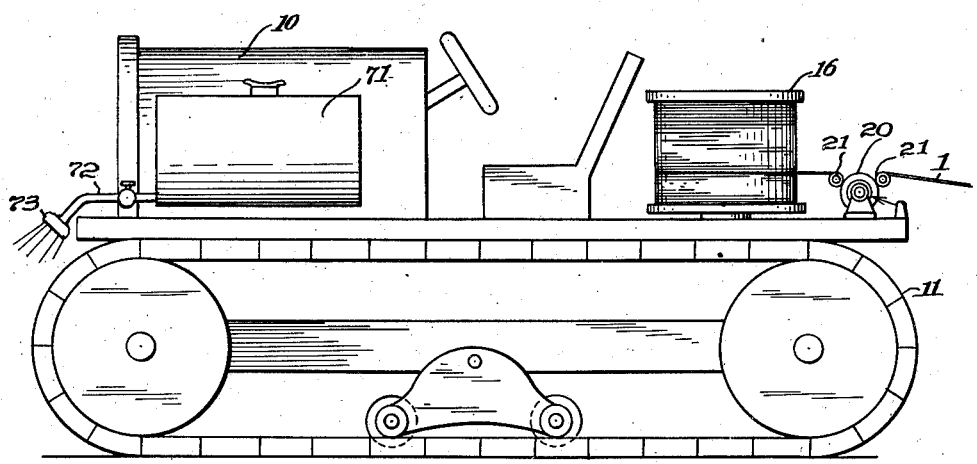
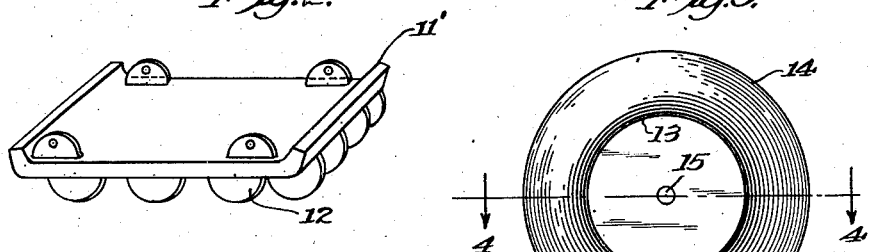
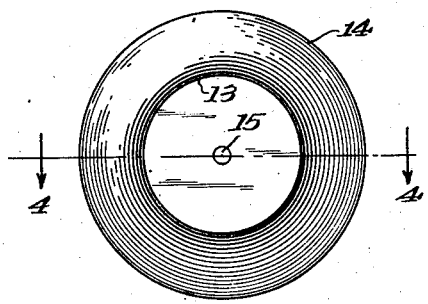
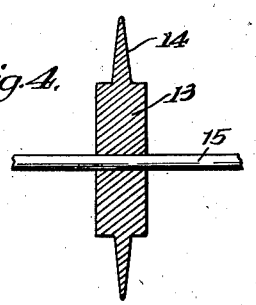
INVENTOR.

Jan. 11, 1938.  J. J. JAKOSKY  2,105,247
METHOD AND APPARATUS FOR ELECTRICAL EXPLORATION OF THE SUBSURFACE
Filed Nov. 25, 1936  3 Sheets-Sheet 2
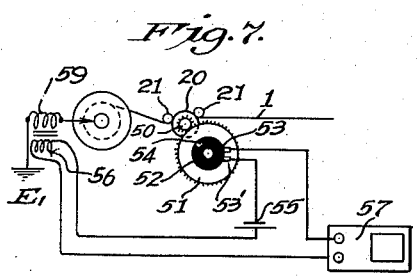
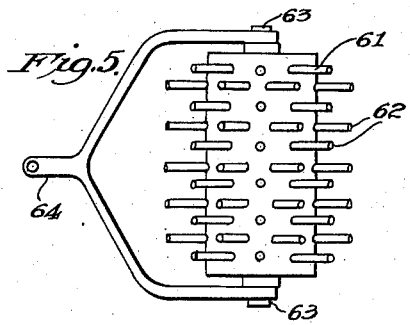
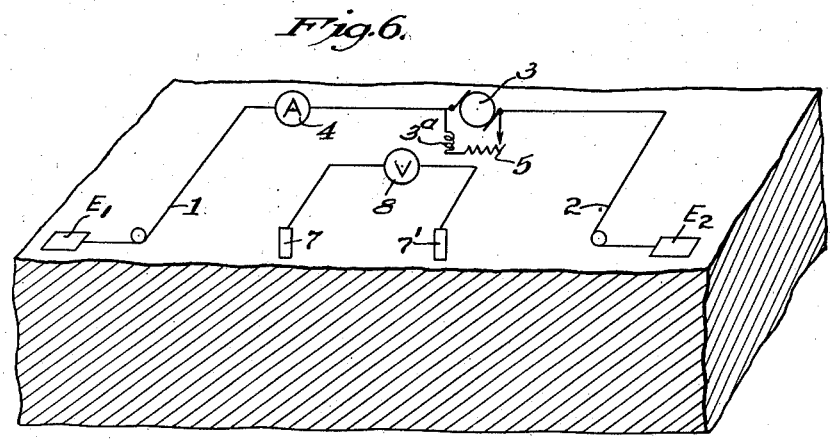
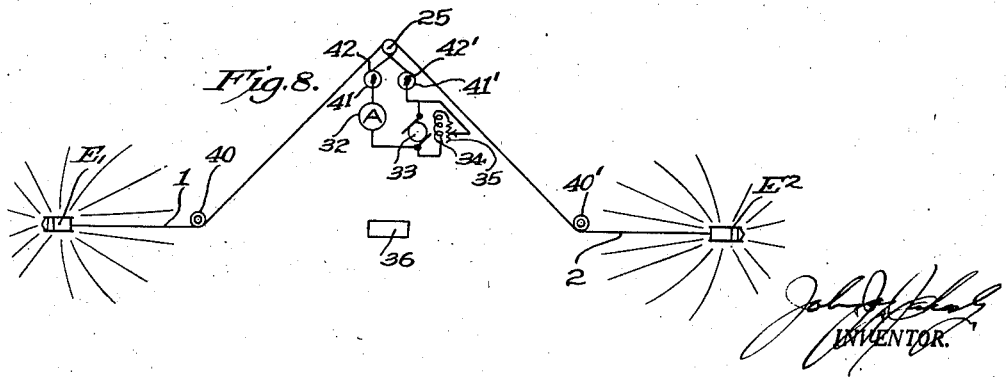

Jan. 11, 1938.    J. J. JAKOSKY    2,105,247
METHOD AND APPARATUS FOR ELECTRICAL EXPLORATION OF THE SUBSURFACE
Filed Nov. 25, 1936    3 Sheets-Sheet 3
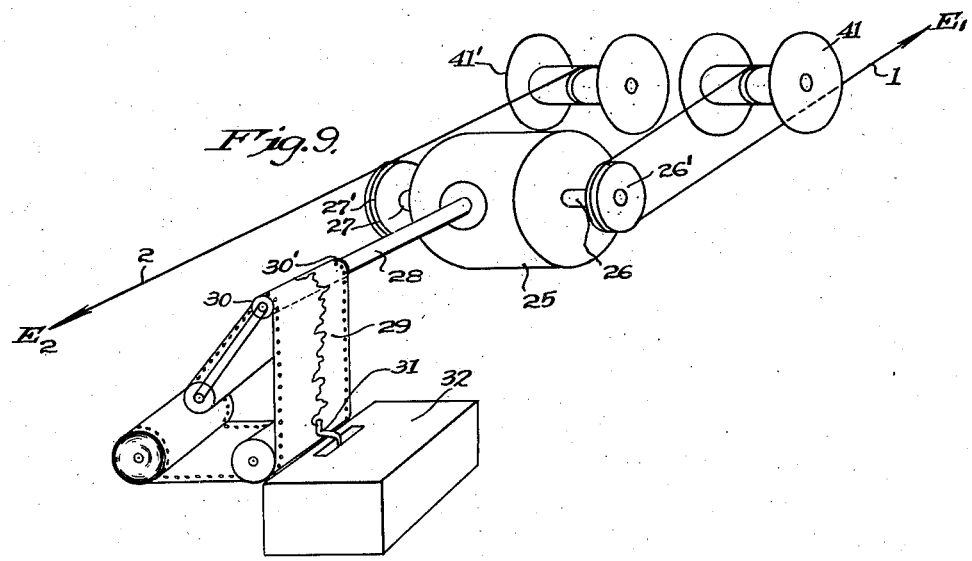
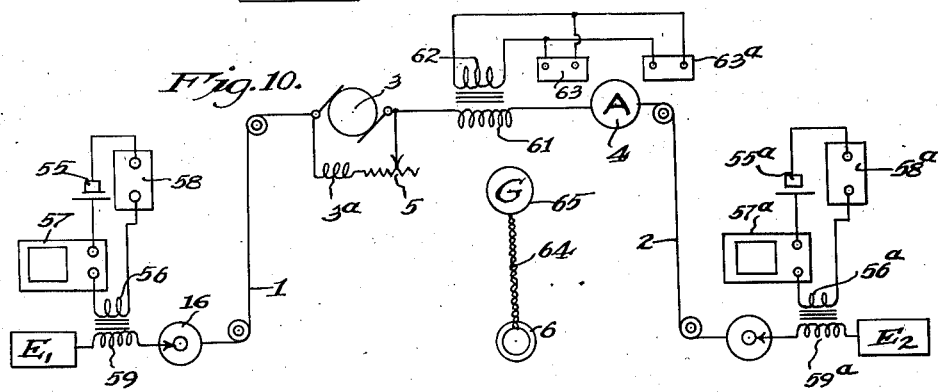
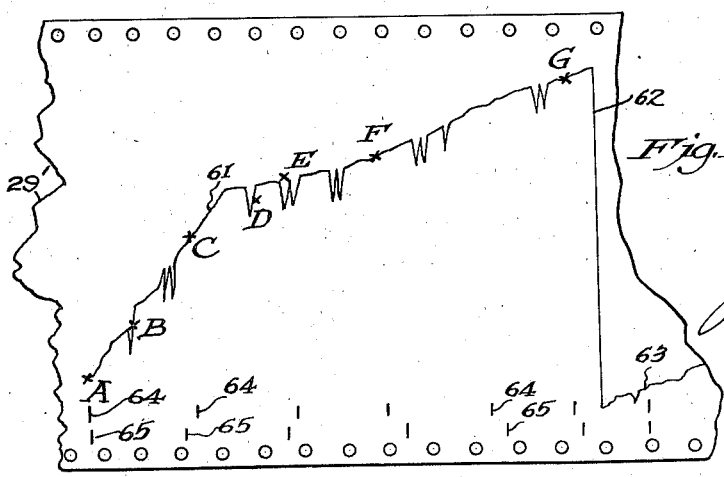
INVENTOR.

Patented Jan. 11, 1938

2,105,247

UNITED STATES PATENT OFFICE 2,105,247

METHOD AND APPARATUS FOR ELECTRICAL EXPLORATION OF THE SUBSURFACE

John Jay Jakosky, Los Angeles, Calif.

Application November 25, 1936, Serial No. 112,747

23 Claims. (Cl. 175—182)

This invention relates to a method and apparatus for electrically exploring the subsurface and pertains more particularly to an improved method and apparatus for use in obtaining electrical potential or magnetic measurements at the surface of the earth.

The method and apparatus of this invention are particularly useful in taking measurements according to my issued patents Nos. 1,906,271 and 2,015,401 and my pending application Serial No. 12,640, but may also be employed in connection with other general methods of electrical investigation of the subsurface.

According to the above-mentioned patents and patent application, electrical energy may be passed through the ground between a pair of electrodes which may consist of metallic stakes or pegs driven into the ground for a sufficient distance to give a good electrical contact. Measurements are usualy made at an initial electrode separation or measuring point and subsequent measurements are made at different electrode separations progressively inwardly or outwardly from the initial separation. The nature of the subsurface is then predicted by comparing the data obtained at these different electrode positions and by comparison with similar data obtained at other stations or positions in the adjacent area. Considerable labor and time is required for the initial laying-out of the stations or locations, since the complete series of electrode separations or measuring points, comprising the station, must be accurately measured and marked on the ground, usually by means of stakes on which are written the separation distance. The electrodes are driven into the ground with heavy hammers and removed from the ground upon the completion of a given set of measurements by a special type of stake puller or by hammering the side of the electrode to loosen the same in the ground and subsequently removing it by hand. Thus it may be seen that a survey of this nature is a relatively slow procedure and extensive field work has shown that it is difficult to take measurements at more than one or two complete stations per day.

The principal object of this invention is to provide an advantageous method and apparatus for the electrical exploration of the subsurface which obviates the necessity of driving electrodes into the ground at each predetermined electrode position.

A further object of the invention is to provide a method and apparatus for the purpose described which may utilize a mobile electrode.

Another object of the invention is to provide a method and apparatus for the above purposes which utilizes a mobile electrode which is in continuous contact with the earth's surface.

Another object of the invention is to provide a method and apparatus for the above purposes in which electrical measurements may be continually taken as a mobile electrode travels over the surface of the earth.

A further object of the invention is to provide for obtaining a graphic representation of the relationship between the electrode spacing and the recorded electrical measurements.

A further object of the invention is to provide an apparatus for synchronizing the movement of a recording medium with the total separation between a pair of moving electrodes.

A further object of the invention is to provide for the combined recording, preferably on a single recording medium, of the electrical measurements and the movement of each electrode, so as to provide an indication of the separation between the electrodes corresponding to each value of the recorded electrical measurements.

Another object of the invention is to provide an advantageous form of mobile electrode which has water or electrolyte spray means for decreasing the contact resistance at the surface of the earth when said mobile electrode is used in dry or sandy locations.

Another important object of the invention is to provide means for rapidly obtaining contact with the earth while making electrical measurements to determine the nature of the subsurface.

A further object of the invention is to provide an advantageous method and apparatus for the electrical exploration of the subsurface which obviates the necessity of surveying and measuring the distances at which the various readings are to be made for the series of measurements which comprise each station.

By utilizing the method and apparatus of this invention the area surveyed during the working day may be greatly increased; for example, when taking intermittent measurements it may be doubled, or when taking continuous measurements greater increases are shown, and in addition, the data obtained is ordinarily more detailed, accurate and reliable.

According to this invention a continuous record is produced, wherein the subsurface properties, such as electrical resistance, impedance, or the effect of such properties on current distribution, phase shift, etc., may be plotted against the electrode separation. Knowing the electrode separation, the effective depth of penetration may be determined by well-established mathematical and empirical relationships. Generally speaking, the effective depth of electric current penetration varies from about .35 to .25 of the electrode separation.

A mobile electrode device according to this invention may comprise, in general, a carriage capable of being moved, or of movement, over the surface of the earth and an electrode associated with said carriage and in contact with the surface of the earth and preferably provided with projections or protuberances capable of penetrating the surface of the earth.

Such a mobile electrode device may comprise a vehicle, preferably motor driven, such as a tractor provided with an endless tread of the "caterpillar" variety or other vehicle provided with earth engaging or "tread" plates or cutting wheels for making continuous or intermittent contact with the surface of the earth. For example, where the surface of the earth is covered with vegetation, is moist, or is near the water-table, the electrodes need not be capable of penetrating below the surface of the earth or if so, for only one or two inches; however, where the surface is dry and non-conductive, the electrodes should be capable of penetrating to a greater depth, and means may also advantageously be provided for minimizing the resistance of this surface layer, such means being provided by a water spray or the like adapted to moisten the soil contacted by the electrode means.

In carrying out the present invention according to a preferred embodiment, an electric current is passed between two electrodes on the earth's surface, and the magnitude of the current is preferably increased or decreased systematically as the distance between the electrodes is increased or decreased, or with the volume of the earth included in the effective path between the electrodes. Continuous or intermittent measurements are made at the surface of the earth to determine the depth and distribution of this current flow. For example, measurements may be made of intensity and/or direction of the electromagnetic field produced by such an electric current, either during the movement of said electrodes or when said electrodes are stationary at different locations. It will be appreciated that the method of this invention is not limited to the use of magnetic measuring means at the surface of the ground, but may be employed for electrical prospecting or exploring systems employing potential electrodes in addition to the power or current electrodes. Either the potential electrodes or the power electrodes may be made to occupy different positions and may be of the mobile type such as herein described, and continuous or intermittent measurements may be taken during the movement of one or more of the electrodes, or while one pair of electrodes is stationary and the other electrodes are in movement, or both pairs of electrodes may be moved to predetermined positions and measurements taken while the electrodes are stationary. In any event, electrodes according to this invention are applicable to any measuring procedure in which it is necessary to provide electrical contact with the earth at a series of positions.

The accompanying drawings illustrate schematically the method of practicing the present invention, and certain apparatus according to my invention, and referring thereto:

Fig. 1 is a side elevation of a mobile electrode device according to my invention;

Fig. 2 is an enlarged perspective view of an advantageous form of tread plate adapted to function as a contact electrode;

Fig. 3 is a perspective view of a further modification of contact electrode;

Fig. 4 is a sectional view thereof taken on line 4—4 in Fig. 3;

Fig. 5 is a plan view of an alternate form of mobile contact device;

Fig. 6 is a partly sectional perspective view of a portion of the earth showing a schematic layout of apparatus;

Fig. 7 is a diagrammatic representation of a contact arrangement for indicating movement of an electrode, which may be used with the form of apparatus shown in Figs. 6 and 10;

Fig. 8 is a schematic diagram of a modified field layout and circuit arrangement;

Fig. 9 is a diagrammatic perspective view of a recording device and means for moving a recording medium in response to the outward movement of two mobile electrode devices;

Fig. 10 is a diagrammatic representation of a field layout and circuit arrangement which may be used in accordance with this invention; and Fig. 11 is a portion of a chart which may be obtained with the apparatus shown in Figs. 6 and 10.

Referring to Fig. 1, a mobile electrode is shown as comprising an electrode-carrying element or carriage 10 such as a tractor provided with ground-engaging electrodes or contact members 11. Such electrodes may comprise tread plates comparable to the plates ordinarily employed with the endless tread or caterpillar type of tractor. Such plates are ordinarily satisfactory when traversing moist ground or other surfaces which afford good contact; however, I prefer to employ a tread plate of the type shown in Fig. 2 which is designated as 11' and is provided with projections or protuberances 12 for penetrating the surface of the ground. Projections in the neighborhood of three inches in length and with somewhat sharpened edges have been found satisfactory under ordinary circumstances. However, when working in certain dry locations I have found it necessary to provide projections from four to eight inches or longer in order to minimize contact resistance and in some instances I have found it necessary to provide water spray means to dampen the surface of the earth next to the contacts. Such water spray means may comprise a suitable water tank 71 connected through a conduit 72 to a spray head 73 and referring to Fig. 1 such a spray head is shown mounted on the front end of a tractor and adapted to spray water or other liquid solution on the surface of the ground in the path of the electrodes 11 so that as the electrode 11 moves it will always be in contact with moist earth. The solution is preferably a saturated salt solution of sodium chloride, or other inexpensive salts. Polarization and other electrochemical effects may be minimized by using a salt of the metal from which the electrode plates 11, 11', etc., are made. Minimizing polarization is advantageous when the electrode is included in the potential measuring circuit.

It will be appreciated that other forms of mobile electrodes may be employed. For example, a wheeled vehicle adapted to be moved manually or by suitable motive power over the surface of the earth may be provided with wheel electrode elements as illustrated in Figs. 3 and 4 and may comprise a disc 13 mounted on a suitable axle structure 15 and provided with a load-bearing surface and a projecting cutting or penetrating edge 14 for contacting the earth, or a heavy roller such as used in road work may be provided with projections for penetrating the earth, and, as shown in Fig. 5, may be moved manually or by a tractor to the desired locations.

Referring to Fig. 5, the mobile electrode device may comprise a roller 61 provided with a plurality of contact projections 62 and a shaft 63 connected to a suitable draft bar 64. The device may be moved over the earth by attaching the bar 64 to a tractor or by other suitable means. The weight of the device and the length of the projection 62 will be dependent to a large extent upon the type of terrain over which the survey is carried and it will be appreciated that under some conditions the device may be sufficiently small to be moved manually. It will also be appreciated that suitable means are provided for establishing electrical connection to the device.

When using a mobile electrode I have found it advantageous to use a reel mechanism as shown in Fig. 1, so that conductor 1 may be stored on a reel 16 associated with the mobile electrode. The mounting of the conductor reel on the mobile electrode device in this manner eliminates the dragging of the conductor over the surface of the earth as the mobile electrode is moved from one position to another, and thus prolongs the life of the conductor. When taking magnetic measurements I find it preferable to mount the reel so that the axis thereof is in a vertical direction in order to minimize the horizontal component of the magnetic flux generated by the reel, although for some measurements the reel may be mounted so that the axis thereof is horizontal. Suitable means may be provided for winding the wire on or off the reel as will be apparent to those skilled in the art. I also preferably provide a measuring sheave wheel 20 having guides 21 for insuring proper contact of the sheave wheel with the wire, so that accurate measurements of the wire or conductor passing over the sheave wheel 20 may be obtained on a suitable measuring device geared or otherwise connected to the sheave wheel 20 as will be more fully brought out hereinafter.

It should be noted that the function of the apparatus illustrated in Figs. 1–5 is to provide a mobile or continuously moving electrode arrangement for making contacts with the surface of the earth at any desired point, and that any suitable means may be provided for this purpose which will perform the same function in a comparable manner. It will also be appreciated that the reel and measuring arrangement shown in Fig. 1 is not necessary for some modes of operation and that such an arrangement is not necessarily a part of the mobile electrode. Thus it may be seen that various forms of reel arrangements and/or mobile electrode devices may be employed for taking measurements on the surface of the earth without departing from the spirit of this invention and that the forms of apparatus illustrated in Figs. 6, 7, 8, 9 and 10 are illustrative of the application of such devices.

The form of apparatus shown in Figs. 6, 7, 8 and 10 may be applied to the magnetometric form of measurement described in my Patent No. 1,906,271, or to the surface potential type of measurement as illustrated in my Patent No. 2,015,401 and my pending application Serial No. 12,640.

Referring to Figs. 6, 7, and 10, mobile electrodes $E_1$ and $E_2$ are connected by means of cables 1 and 2, to the power supply apparatus 3. This apparatus may comprise a continuous source of power as, for instance, a low frequency alternating current generator, or a direct current generator, or it may comprise an intermittent type of power supply as described in my Patent No. 2,015,401; however, for the purpose of simplicity I have shown a direct current generator 3 with a field coil $3a$ and a field rheostat 5. A current measuring meter 4 and the current controller rheostat 5 are employed for obtaining the proper current flow in the circuit. The distribution of subsurface current may be studied by magnetometric methods as described in my Patent No. 1,906,271, wherein magnetometers are positioned on the surface of the ground at one or more positions within the electromagnetic field created by the flow of current through the earth between electrodes $E_1$ and $E_2$ as shown, for example, at 6 in Fig. 10. Such magnetometer may be of any of the types shown in said Patent No. 1,906,271. If desired, the magnetometer 6 may be of the earth inductor type, whereby the strength of the magnetic field associated with the flow of subsurface current may be measured, or two inductors may be opposingly connected to form a gradiometer so as to measure the magnetic gradient.

If the distribution of subsurface current flow is studied by means of electrodes making contact with the surface of the ground, as described in my Patent No. 2,015,401, then electrodes 7 and 7' are employed, and connected to a suitable potential measuring device 8 as shown in Fig. 6. If desired, electrodes 7 and 7' may be replaced with moving electrodes (similar in principle to the mobile electrode devices $E_1$ and $E_2$), preferably spaced a certain predetermined distance from the electrodes $E_1$ and $E_2$. The potential electrodes 7 and 7' are preferably located along a line passing through the energizing electrodes $E_1$ and $E_2$, and the two sets of electrodes are preferably disposed substantially symmetrically with respect to a common point on said line, midway between the two electrodes of each set. The mobile energizing electrodes may either be disposed outwardly with respect to the potential electrodes, as shown in Fig. 6, and progressively moved either outwardly from or inwardly toward said potential electrodes, or may be disposed between the potential electrodes and moved either outwardly toward or inwardly from said potential electrodes. If desired, the potential electrodes 7 and 7' may be moved concurrently with the movement of the energizing electrodes $E_1$ and $E_2$, in any of the above cases, so as to maintain any desired symmetrical relationship between the positions of said electrodes. For example, it is possible in this manner to maintain a uniform ratio between the spacing of the electrodes 7 and 7' and the spacing of the electrodes $E_1$ and $E_2$.

When using the magnetic method of measurement, the surface magnetometers, inductors or gradiometers are set up at their designated positions and properly adjusted. The electrodes $E_1$ and $E_2$ are moved to their proper initial positions, whereupon the initial reading may be made. The electrodes $E_1$ and $E_2$ are then placed in motion and subsequent readings made as their separation increases. This process is continued until a series of measurements have been made throughout the desired depth interval or total electrode separation, and a curve may then be drawn showing the relationship between magnetic field strength or gradient and electrode separation or depth of penetration. A similar procedure may be employed when surface potential measurements are made.

The method of laying out the surface lines or conductors 1 and 2 is described in my prior patents enumerated herein, and the precautions given therein should be followed in order to avoid electromagnetic coupling between the measuring instrument or circuit and the power energizing circuit.

When proceeding with measurements with the apparatus delineated in Figs. 6, 7, and 10, in which the conductors 1 and 2 are carried on reels provided on the mobile electrodes $E_1$ and $E_2$, as shown in Fig. 1, or on reel-carrying apparatus which may be associated with the electrode devices of the type shown in Figs. 2–5, I find it preferable to provide means for indicating the distance traversed by each of said electrodes so that separation of said electrodes may be determined and the effective depth of current penetration may be calculated. Such indicating means may be provided by connecting a suitable contacting device with the measuring machine wheel 20 of Fig. 1 as will be more fully described hereinafter. It will be appreciated, however, that a carrier current telephone system may be employed for communication between operators located at the electrodes $E_1$ and $E_2$ and the recording station for indicating the relative positions of the electrodes.

An automatic measuring device, however, is of definite advantage, and used in conjunction with the present invention constitutes an important phase thereof. This measuring arrangement is described in the following paragraphs.

Referring particularly to Figs. 1, 7, and 10, a geared commutator is operatively associated with the measuring wheel 20 and arranged to make an electrical contact when the measuring wheel travels a predetermined distance. For instance, the commutator may be so geared as to make electrical contact every 100 feet of wire unreeled from the reel 16. This commutator is incorporated into an electrical circuit, as shown in Figs. 7 and 10. The measuring sheave 20 is connected by means of a small pinion gear 50 to a gear 51. Fastened to the gear 51 is a commutator 52. The ratio between gears 50 and 51, and the diameter of the sheave wheel 20, is such as to give one contact for each 100 feet or other suitable unit of length of wire measured through the sheave. Suitable contact-making brushes 53 and 53' bear against the commutator 52. Inserted in the commutator 52 is a contact bar 54, the function of which is to make an electrical connection between brushes 53 and 53' for each revolution of the commutator. Connected in series with the brushes 53 and 53' is a battery 55, the primary of a transformer 56, and a tuned buzzer 57.

The contacting mechanism comprising the commutator 52, brushes 53 and 53', contact bar 54, and the associated gears is indicated generally at 58 and 58a in Fig. 10.

Referring particularly to Fig. 10, it will be noted that the apparatus adjacent the electrode $E_2$ is identical with the apparatus adjacent the electrode $E_1$. Apparatus affected by electrode $E_2$ is marked with a subscript "$a$" as well as the apparatus adjacent thereto, while apparatus adjacent and affected by electrode $E_1$ has no subscript on the reference numerals. A transformer primary 61 is shown connected between the current source 3 and recording ammeter 4, and the secondary 62 of said transformer is shown connected to a recording stylus 63 adapted to be actuated by impulses sent from the electrode $E_1$ and a recording stylus 63a adapted to be operated by impulses sent from the electrode $E_2$. For example, the buzzer 57 may be tuned to give a 500-cycle note, and the stylus 63 may be responsive to such a note and will produce a suitable record on a recording medium. The buzzer 57a may be tuned to, for example, 600 cycles, so that for every hundred feet the electrode $E_2$ travels, the stylus 63a tuned to 600 cycles will produce a mark on the recording medium.

An earth inductor 6 is shown connected through a twisted pair 64 to a galvanometer 65 located adjacent the field rheostat 5. I preferably maintain a constant reading on the galvanometer 65 by adjusting the rheostat 5 and record the current in the conductors 1 and 2 on the ammeter 4 required to maintain a constant reading on the galvanometer 65 as the separation is varied between the electrodes $E_1$ and $E_2$. The recording meter 4 may be, for example, a meter utilizing a paper tape record actuated by clockwork and I have found that a paper speed of approximately two inches per hour is satisfactory for most recording purposes. Thus it will be seen that as the electrodes $E_1$ and $E_2$ move outwardly, the buzzers 57 and 57a respectively will send impulses over the conductors 1 and 2 and operate the respective styli 63 and 63a upon the completion of given distance increments by each of the electrodes, making identifiable marks on the recording medium. Since the recording ammeter 4 constantly indicates the value of the current in the conductors 1 and 2 and each of the styli 63 and 63a record the positions of the respective electrodes, it is obvious that the current in the conductors 1 and 2 for any given separation of the electrodes $E_1$ and $E_2$ may be determined by inspection of the recording meter record.

In Fig. 11 I have illustrated a typical record as obtained from field operation of this process. Referring to that figure, the recording medium, such as a recorder paper 29', is moved forward by a conventional clock-actuating mechanism at a given speed. Variations in current required to give the proper reading of the galvanometer 65 of Fig. 10 are recorded by a line 61. As the greater depths of penetration are reached, the current gradually increases until its value comes toward the end of the paper. At this point the entire scale is shifted to the lower end and suitable records made on the paper in order that the operator may later interpret the data. In Fig. 11 this shift of scale is represented at 62 and the new continuation of the record represented at 63. The distance increments recorded by the alternating current-operated tuned styli are represented by the row of marks 64 for electrode $E_1$ and the row of marks 65 for electrode $E_2$. Upon completion of the field work the data is usually interpreted by taking the general points of inflection on the curve, or points equally spaced on the curve as, for instance, points A, B, C, D, etc., of Fig. 11, and arranging them in tabular form. The separation between stations is determined by counting the number of intervals made by each of the recording styli. The total distance separation may be determined by interpolating between these various points without serious error by assuming a constant speed for the electrodes between any two given increment marks.

For example, at the point A the electrodes $E_1$ and $E_2$ have a known separation, and for the purposes of simplicity the marks 64 and 65 are shown as coincident. Thus it may be seen that for each given distance increment travelled by the electrodes, there will be a mark 64 or 65 on the record 29' and the distance between the adjacent marks 64 or 65 is indicative of the time required for each electrode to complete a given distance increment and the total separation of the two electrodes $E_1$ and $E_2$ is equal to the sum of the total number of marks 64 and 65 from the point A. The indicated depth of penetration, assumed in this case to be one-third, may next be tabulated in a separate column. By reference to the graph 61, the total current flowing in the circuit to produce a given horizontal component reading, may be recorded in a separate column. From this a current factor may be computed. The current factor may be merely a ratio of the separation divided by the current. The current factor is now plotted on a separate sheet with current factor as ordinate, and indicated depth of penetration as abscissa. This constitutes a complete record for the station, and these records may be compared with those obtained from other stations whereby the relative stratigraphic height of the two stations may be determined.

In the application of this method it may be advisable in some cases to maintain a regular predetermined relationship between the amount of current flowing in the sub-surface versus the distance of electrode separation. This general procedure has been described in connection with my pending application Serial No. 12,640.

It will be appreciated that the apparatus shown in Figs. 7 and 10 may be used with the surface layout as shown in Fig. 6 for taking potential measurements according to my Patent No. 2,015,401. The potential indicating device 8 is preferably located adjacent the field rheostat 5 so that said rheostat may be adjusted to maintain a constant value of potential at 8 as the separation between the electrodes $E_1$ and $E_2$ is varied, and the current required to maintain a given potential at 8 will be recorded on the recording ammeter 4 while the positions of the electrodes $E_1$ and $E_2$ will be indicated by the impulses received by the styli described above.

Referring to Figs. 8 and 9, I have shown an arrangement of apparatus in which the conductor reels are located at a central point and the conductor attached to each electrode is dragged over the surface of the earth as each electrode is moved from point to point.

In taking measurements according to this invention the electrodes $E_1$ and $E_2$ are moved to different predetermined locations and measurements are made either while the electrodes are in motion or when they are stationary at such predetermined locations. Thus it may be seen that by providing means for recording measurements on a recording medium which is automatically moved according to the movement of the electrode means, it is possible for me to dispense with the necessity of a preliminary survey to mark predetermined electrode locations on the surface of the earth, so that considerable saving in time and expense is obtained. Such means may comprise a differential drive mechanism 25 provided with pulley shafts 26 and 27 cooperating therewith to produce motion in a shaft 28 which is proportional to the sum of the movements of the shafts 26 and 27. The differential gear mechanism 25 may be comparable to the differential employed to couple the rear wheels of an automobile to the drive shaft and may comprise any suitable mechanism capable of performing this function.

The pulley shafts 26 and 27 may be respectively provided with measuring pulleys 26' and 27' adapted to rotate in accordance with the distance traversed by the conductors 1 and 2 connected to the respective electrodes $E_1$ and $E_2$, so that the rotation of the shaft 28 will be proportional to the total separation or distance between the electrodes $E_1$ and $E_2$. Thus a recording medium such as the recording paper 29 may be propelled by sprockets 30 and 30' coupled to the shaft 28 so that the movement of the recording medium will be proportional to the distances traversed by the electrodes $E_1$ and $E_2$, even though the electrodes do not move simultaneously or one of the electrodes remains stationary.

Various types of recording systems may be employed but for the purpose of simplicity I have shown a paper strip 29 on which a record may be traced by the stylus 31 of a recording ammeter 32 connected in series with the conductors 1 and 2 and a source of electrical current 33, such as a direct or alternating current generator or other suitable source of current as pointed out above.

The apparatus illustrated in Fig. 9 may be advantageously employed for taking measurements in accordance with the layout shown in Fig. 8, in which the conductors 1 and 2 are shown connected to the mobile electrodes $E_1$ and $E_2$ and through measuring pulleys 26' and 27' on the differential 25 to reels 41 and 41' respectively. I also preferably provide idlers 40 and 40' located at a considerable distance from the reels 41 and 41' so that such reels may be located at a considerable transverse distance from the line between the electrodes $E_1$ and $E_2$. The ends of the conductors 1 and 2 which are located on the reels 41 and 41' may be connected through a commutator arrangement 42 and 42', as will be apparent to those skilled in the art, to the current supply apparatus 33.

The reels 41 and 41' are preferably placed so that their magnetic fields are in opposition in order to minimize the magnetic field produced by such reels in the event that the magnetic field produced by the current through the earth between the electrodes $E_1$ and $E_2$ is to be measured.

For the purpose of simplicity I have shown the current supply 33 as a shunt generator having a field coil 34 and a field rheostat 35. I have found it preferable to record the current in the conductors 1 and 2 required to maintain a constant condition for some electrical manifestation due to the current flowing through the ground between $E_1$ and $E_2$ as the separation therebetween is varied. Thus by placing an instrument such as an earth inductor or a magnetometer in a position to be affected by the current flowing from $E_1$ to $E_2$ according to a well-known manner, as at the position 36 in Fig. 8, and providing means for communicating the readings obtained at 36 to a point where the current flow in the electrode circuit can be regulated, such a point being adjacent the rheostat 35, the current in the circuit may be maintained at a proper value to give the required reading at 36 and the value of the current will be recorded at 32 versus the electrode separation. Although no means are shown for communicating from 36 to 35, it is obvious that the readings may be transmitted telephonically or that a "Selsyn" control or other known means may be employed to operate the rheostat 35 from a point adjacent the inductor or magnetometer 36. In case an earth inductor is employed at 36, it may be electrically connected to a galvanometer adjacent the current control 35, in a manner comparable to that illustrated in Fig. 10.

Measurements may be taken continuously as the electrodes $E_1$ and $E_2$ traverse the surface of the earth or may be taken intermittently at certain predetermined positions of the electrodes either while the electrodes are in motion or while either one or both of the electrodes are standing still. It will be appreciated that other forms of measurement may be taken with the apparatus shown in Figs. 8 and 9 and that other data besides current values may be recorded on the recording medium 29 as will be apparent to those skilled in the art.

It will also be appreciated that certain precautions must be taken in the positioning of the conductors 1 and 2 and the location of the associated apparatus, and also with respect to the measurements which are taken. Such precautions are fully described in my above-mentioned patents and patent application.

I claim:

1. A method of electrical exploration of the subsurface which comprises: maintaining a pair of electrodes in continuous contact with the earth while moving at least one of said electrodes along the surface of the earth to vary the distance therebetween; passing electric current through the earth between said electrodes as the distance therebetween is varied, so as to vary the depth of penetration of said current within the earth; and measuring variations in a quantity influenced by the flow of said current and by the electrical characteristics of the earth traversed thereby, as the distance between said electrodes is so varied.

2. A method of electrical exploration of the subsurface which comprises: maintaining a pair of electrodes in continuous contact with the earth while moving at least one of said electrodes along the surface of the earth to vary the distance therebetween; passing electric current through the earth between said electrodes as the distance therebetween is varied, so as to vary the depth of penetration of said current within the earth; and recording variations in a quantity influenced by the flow of said current and by the electrical characteristics of the earth traversed thereby, as the distance between said electrodes is so varied, in such manner as to provide a graphic representation of the relationship between the recorded values of said quantity and the distance between said electrodes.

3. The method as set forth in claim 2, in which the variations in said quantity are recorded on a recording medium while moving said medium in response to variations in the distance between said electrodes.

4. The method as set forth in claim 2, in which the variations in said quantity and the variations in the distance between said electrodes are recorded in correlated positions on a common recording medium.

5. A method of electrical exploration of the subsurface which comprises: passing electric current through the earth between a pair of mobile electrodes; moving said electrodes relative to one another to vary the distance therebetween, while continually maintaining each of said electrodes in contact with the earth; and taking measurements between two other electrodes connected to the surface of the earth, when said mobile electrodes are located at different distances from one another.

6. The method as set forth in claim 5, in which said mobile electrodes are moved substantially along the line connecting said other electrodes and are disposed between said other electrodes.

7. A method of electrical exploration of the subsurface, which comprises: passing an electric current through the earth between a pair of energizing electrodes in electrical contact with the earth and spaced from one another along the surface thereof; maintaining a pair of potential electrodes in substantially continuous electrical contact with the earth while moving at least one of said potential electrodes along the earth's surface; and taking measurements between said potential electrodes when said one potential electrode is at different positions.

8. A method of electrical exploration of the subsurface, which comprises: passing an electric current through the earth between a pair of energizing electrodes; moving at least one of said energizing electrodes over the earth's surface while maintaining the passage of said current during such movement; maintaining a pair of potential electrodes in substantially continuous contact with the earth while moving at least one of said potential electrodes along the earth's surface; and taking measurements between said potential electrodes when said one potential electrode is at different positions.

9. The method of electrical exploration of the subsurface which comprises: passing an electric current through the earth between a pair of mobile electrodes; moving said electrodes relative to one another along the surface of the earth to vary the distance therebetween, while continually maintaining each of said electrodes in contact with the earth; and measuring variations, at a position spaced from said mobile electrodes, in the magnetic field created by the flow of current through the earth between said electrodes as the distance therebetween is so varied.

10. A method of electrical exploration of the subsurface which comprises: passing an electric current through the earth between a pair of spaced electrodes in contact with the earth's surface; moving at least one of said electrodes along the surface of the earth while maintaining both of said electrodes in continuous contact with the earth and maintaining the passage of said current, so as to vary the path of said current through the earth; and measuring variations in a quantity influenced by the flow of said current and the electrical characteristics of the earth traversed thereby, as the path of current flow through the earth is varied.

11. In an apparatus for electrical exploration of the subsurface, the combination which comprises: a mobile electrode movable over the surface of the earth and adapted to make continuous electrical contact therewith during such movement; an electric circuit removed from said electrode; and a conductor connecting said electrode to said circuit and adapted to maintain continuous connection of said electrode to said circuit during the movement of said electrode.

12. The invention as set forth in claim 11, said electrode comprising a ground-engaging member provided with projection means adapted to penetrate the earth's surface to a sufficient depth to maintain good electrical contact with the earth.

13. The invention as set forth in claim 11, and also comprising means associated with said movable electrode and operable to supply water to the surface of the earth contacted by said electrode.

14. In an apparatus for electrical exploration of the subsurface, the combination which comprises: a mobile electrode movable over the surface of the earth and adapted to make continuous contact therewith during such movement; an electric circuit removed from said electrode and including a source of electric current; and a conductor connecting said electrode to said circuit and adapted to maintain continuous connection of said electrode to said circuit during the movement of said electrode.

15. In an apparatus for electrical exploration of the subsurface, the combination which comprises: two electrodes movable over the surface of the earth and adapted to make continuous electrical contact therewith; an electric circuit removed from said electrodes; and conductor means connecting said electrodes to said circuit for maintaining said electrodes in continuous connection with said circuit during the movement of said electrodes.

16. In an apparatus for electrical exploration of the subsurface, the combination which comprises: a motor-driven carriage; electrode means associated with said carriage and adapted to maintain continuous contact with the surface of the earth upon movement of said carriage thereover; an electric circuit removed from said carriage; and a conductor connecting said electrode means to said circuit and adapted to maintain continuous connection therebetween during movement of said carriage.

17. The invention as set forth in claim 16, and also comprising water spray means mounted on said carriage in position to supply water on the surface of the earth in the path of said electrode means.

18. The invention as set forth in claim 16, said electrode means being provided with projections for penetrating the surface of the earth to a sufficient depth to maintain good electrical contact with the earth.

19. In an apparatus for electrical exploration of the subsurface, the combination which comprises: a measuring device; two spaced electrodes adapted for continuous electrical connection with the surface of the earth and movable with respect to one another so as to vary the distance therebetween; electric current supply means connected to said spaced electrodes; and means associated with said electrodes and with said measuring device for recording the relationship between the measurements furnished by said measuring device and the distance between said electrodes.

20. In an apparatus for electrical exploration of the subsurface, the combination which comprises: a measuring system including a recording device; a movable recording medium associated with said device; two mobile electrodes adapted to maintain continuous electrical contact with the earth during movement thereof over the earth's surface; electric current supply means connected to said mobile electrodes; and means for operating said recording medium in response to the movement of said electrodes in such manner as to effect a movement of said medium proportional to variations in the distance between said electrodes.

21. In an apparatus for electrical exploration of the subsurface, the combination which comprises: a measuring system including a recording device; a recording medium associated with said device; two spaced mobile electrodes adapted to maintain continuous electrical contact with the earth; electric current supply means connected to said mobile electrodes; and a recording device operable in response to relative movement of said electrodes and associated with said movable recording medium, whereby measurements in said measuring system and variations in the distance between said electrodes may be recorded in correlated position on said movable recording medium.

22. In a method of electrical exploration of the subsurface, the steps which comprise: moving an electrode device over the surface of the earth while maintaining said electrode device in continuous electrical contact with the earth; maintaining said electrode device in electrical connection with a source of electric current and another electrode through a circuit including a conductor wound on a rotatable reel on said electrode device, said conductor being unwound from said reel as said electrode device is so moved; passing an electric current from said source into the earth through said electrode device; and measuring the length of conductor unwound from said reel.

23. In an apparatus for the electrical exploration of the subsurface, the combination which comprises: an electrode device movable over the surface of the earth and adapted to maintain continuous electrical contact therewith during such movement; an electric circuit removed from said electrode; a reel mounted on said electrode device; a conductor wound on said reel and connecting said electrode to said circuit and adapted to maintain continuous connection of said electrode to said circuit during movement of said electrode, said conductor being unwound from said reel during movement of said electrode device; and means for measuring the length of conductor unwound from said reel.

JOHN JAY JAKOSKY.